March 17, 1953  O. R. ANGELL  2,631,397
ARTIFICIAL FISH BAIT
Filed June 14, 1949
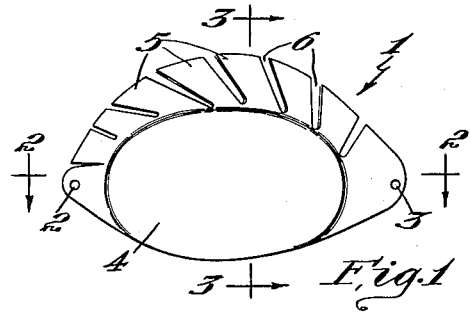
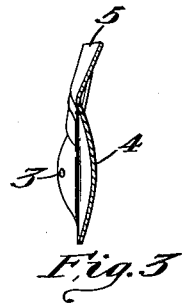
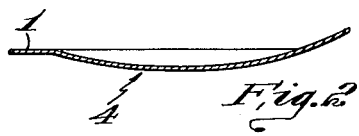
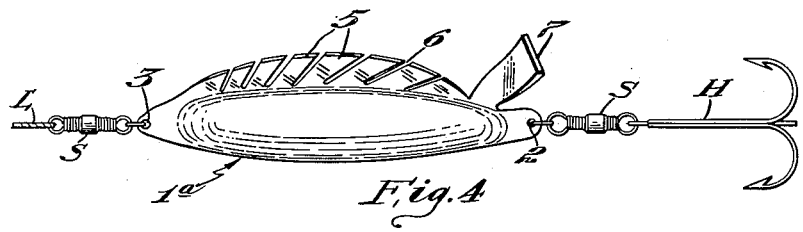
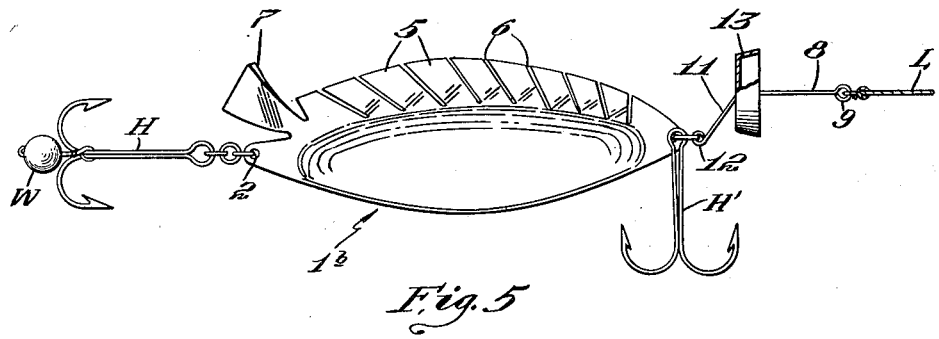
Inventor
Otis R. Angell
by Roberts Cushman & Grover
Att'ys.

Patented Mar. 17, 1953

2,631,397

UNITED STATES PATENT OFFICE 2,631,397

ARTIFICIAL FISH BAIT

Otis R. Angell, North Quincy, Mass.

Application June 14, 1949, Serial No. 99,065

4 Claims. (Cl. 43—42.51)

1

This invention pertains to artificial fish-bait, particularly to baits of the spoon-hook type. Usually the spoon of a spoon-hook bait is so connected to the shank of the hook or to a spindle or leader normally aligned with the hook shank that the spoon revolves bodily in an orbit which is spaced from the axis of rotation. The movement of the spoon along this orbital path is relatively slow so that the resultant flashes of light reflected from the broad surface of the spoon occur at appreciable intervals. Such a revolving spoon has little real resemblance to a swimming minnow.

One object of the present invention is to provide a bait of the spoon-hook type which, in use, more nearly resembles a living minnow than does the usual prior spoon-hook. A further object is to provide a bait comprising a spoon which is shaped to resemble the body of a fish, and which sparkles brilliantly when in use. A further object is to provide a bait having a body portion which in contour is generally fish-shaped and which rotates about its longitudinal axis. A further object is to provide a bait of the spoon-hook type wherein the spoon element revolves about its own longitudinal axis and also has an irregular motion of bodily revolution about the axis of the line or leader. A further object is to provide a bait of the above type wherein the longitudinal axis of the spoon element is laterally offset from the axis of the line and with provision for agitating the water just in advance of the forward end of the spoon element. Other and further objects and advantages of the invention will be pointed out in the following more detailed description and by reference to the accompanying drawings wherein:

Fig. 1 is a side elevation illustrating the body portion of a simple embodiment of the bait of the present invention, but omitting the hook and line;

Fig. 2 is a section on the line 2—2 of Fig. 1;

Fig. 3 is a section on the line 3—3 of Fig. 1;

Fig. 4 is a side elevation illustrating a bait of slightly modified construction, showing the bait attached to a line and hook;

Fig. 5 is a view similar to Fig. 4, but showing a further modification and showing the opposite side of the body portion from that seen in Fig. 4; and Fig. 6 is a plan view of the device shown in Fig. 4, the hook being omitted.

Referring to the drawings, the numeral 1 indicates the body portion of the bait. This body portion is preferably of unitary construction, being stamped or pressed from thin but stiff sheet metal or formed from a synthetic plastic or other suitable material. As illustrated in Fig. 1, the body portion has a contour such that it more or less resembles a small fish of the sun-fish family. At its opposite ends the body portion is provided with openings 2 and 3 for attachment of a hook and line, respectively. This body portion is shaped to provide the spoon 4, which is concavo-convex, as illustrated in Fig. 2 the cavity being at the same side of the spoon from end to end of the latter. This spoon shaped part is located at the lower part of the body portion as shown in Fig. 1. The lower edge of the body portion is smoothly uninterrupted from one end to the other of the spoon. Above the spoon, as here illustrated, the marginal portion of the body is interrupted by a series of narrow slits 6, thereby providing a series of upstanding blade-like fins 5 which extend inwardly and terminate near the upper boundary of the spoon. These slots 6 are so shaped that the blades or fins 5 incline rearwardly so that the series of blades, when viewed as shown in Fig. 1, more or less resembles the dorsal fin of a fish. As illustrated in Fig. 3, the blades or fins 5 are so bent that they lean away from a vertical plane through the upper and lower edges of the spoon and toward the convex side of the spoon. Each of these blades 5 is also twisted so that its outer portion, at least, forms a segment of a helical surface, the succession of blades 5 thus acting like propeller blades, when the device is drawn through the water, so as to cause the bait to rotate rapidly about a longitudinal axis through the openings 2 and 3.

The bait illustrated in Figs. 1, 2 and 3 may be used without further modification, the hook being appropriately attached, either with or without an intervening swivel, to the rear end of the body and the line being connected, with or without an intervening swivel and/or leader, to the forward end of the body. When this bait is drawn through the water, it spins rapidly about the axis of the line. The light reflected from the broad surface of the spoon produces intermittent flashes at relatively slow intervals while the light reflected from the many inclined blades 5 produces multiple sparkles. The rapid rotation of the spoon about its own longitudinal axis produces the visual effect of a body of substantial transverse thickness, although the spoon is actually of thin material. Thus the rapidly spinning body much more closely resembles a fish than does the usual spoon which travels in a wide orbit spaced from the axis of revolution.

In Fig. 4, a modification is illustrated wherein the body portion 1ᵃ with its blades 5 and intervening slots 6 is substantially the same as shown in Fig. 1, except that the body portion is shaped more like an ordinary minnow than like a sunfish. However, in this instance, in addition to the series of blades 5, there is provided a special longer blade 7 at the rear end of the series, extending upwardly and rearwardly from the rear end of the body and whose outer portion at least does not form a segment of the helix defined by the blades 5. This blade or fin 7 may be likened to the tail of the fish, except that it is unsymmetrical with respect to the axis of the body, so that it tends to cause the body to flutter or sway irregularly with respect to the axis of the line by means of which the bait is drawn through the water. At the same time the body spins about its longitudinal axis, thus giving the effect of solidity and transverse thickness and producing the multiple sparkles above referred to, while the body sways and moves in an irregular manner which simulates the movements of a fish which has been injured. In Fig. 4 the line L is shown connected by a swivel S to the forward opening 3 of the body while the hook H is shown connected by swivel S to the rear opening 2 of the body.

In Fig. 5 a further modification of the bait is illustrated, the body portion 1ᵇ being substantially like that shown in Fig. 4, having the series of dorsal blades 5 and the tail blade 7, and having the hook H connected to its rear end. As illustrated, this hook is provided at its rear end with a ball W which is of heavy material, for example, lead or steel, and which acts more or less like a pendulum bob as the device is drawn through the water. Instead of connecting the line directly to the forward end of the body, the line L is connected to a leader consisting of a rigid piece of wire having the forward part 8 provided with the eye 9 to which the line is attached. This length of stiff wire is bent at an obtuse angle to provide the rear portion 11 which is inclined with respect to the portion 8 and which has an eye 12 at its rear end by means of which the leader is connected to the forward end of the body 1ᵇ. With this arrrangement it may be noted that the longitudinal axis of the body 1ᵇ is offset laterally with respect to axis of the line L. A shallow cup member 13 is fixed to the inclined portion 11 of the leader, and when the bait is drawn through the water, this cup member or baffle produces an agitation of the water immediately in front of the body portion of the bait tending to induce irregularity in the motion of the body portion through the water. This agitation of the water accentuates the action of the blades 5 and the tail member 7, so as to cause unpredictable, irregular motions of the bait as it is drawn through the water. The weight W at the rear end of the hook H acts as a damping element to slow down the swaying movements of the bait, so that such movements do not become too pronounced or of too great amplitude. Obviously the arrangement for attaching the line and hook to the body portion of the bait, as shown in Fig. 5, may be used in attaching the line and/or hook to the body portion of the baits of Figs. 1 and 4. As illustrated in Fig. 5, an additional hook or hooks H' may be attached to the forward portion of the body of the bait if desired.

While for convenience in description it is assumed that the bait occupies the positions shown in Figs. 4 and 5 it is to be understood that when reference is made to the upper and lower edges of the body portion of the bait, such reference is not limiting, but merely relative, since the bait, when in use, spins about its longitudinal axis.

While certain desirable embodiments of the invention have herein been illustrated by way of example, it is to be understood that the invention is broadly inclusive of any and all modifications falling within the appended claims.

I claim:

1. An artificial fish bait comprising a body of fishlike contour comprising an elongate concavo-convex spoon portion, the body having means whereby a hook may be attached to one of its ends and a line to the other end, a series of blades projecting from one edge of the spoon portion, said blades being bent toward the convex side of the spoon portion and being twisted so that they constitute segments of a helical surface whereby the spoon is caused to rotate about its own axis, a rigid angular leader attached at its rear end to the forward end of the body, said leader being provided with means at its forward end for attachment to a line, and a rigid baffle fixed to the leader intermediate its ends.

2. An artificial fish bait comprising a body of fishlike contour comprising an elongate concavo-convex spoon portion, the body having means whereby a hook may be attached to one of its ends and a line to the other end, a series of blades projecting from one edge of the spoon portion, said blades being bent toward the convex side of the spoon portion and being twisted so that they constitute segments of a helical surface whereby the spoon is caused to rotate about its own axis, a leader of stiff wire bent at an obtuse angle between its ends, the forward end portion of the leader having means for attaching it to the line and being normally coaxial with the line, the other end portion of the leader being connected to the forward end of the body and a rigid cup-like baffle attached to the leader between the bend and its rear end.

3. An artificial fish bait comprising a body of fishlike contour comprising an elongate concavo-convex spoon portion, the body having means whereby a hook may be attached to one of its ends and a line to the other end, a series of blades projecting from one edge of the spoon portion, said blades being bent toward the convex side of the spoon portion and being twisted so that they constitute segments of a helical surface whereby the spoon is caused to rotate about its own axis, and means for connecting the line to the forward end of the body with the axis of the line spaced from the longitudinal axis of the body.

4. An artificial fish bait having a body of fishlike contour provided at each end with a hole for the attachment of a hook and a line, respectively, and consisting of a unitary piece of thin, stiff material and comprising an elongate spoon portion which is concavo-convex both longitudinally and transversely, the concavity being at the same side of the spoon portion throughout the length and width of the latter, one edge of the body being smoothly uninterrupted from end to end of the spoon portion, the opposite edge of the body being interrupted by a series of narrow, upwardly and rearwardly inclined slits defining a series of closely spaced blades integral with and projecting upwardly from the spoon portion, the series of blades extending continuously from a point near the forward end of the spoon portion to a point near the rear end of the spoon portion, all of said blades being bent toward the convex side of the spoon portion and being twisted so that they constitute helical segments whereby the body is caused to rotate about its own longitudinal axis when drawn through the water, the bait having only one tail member which is arranged unsymmetrically with respect to the longitudinal axis of the body, being located wholly to one side of said axis, and which projects upwardly and rearwardly, being integrally joined to the spoon portion at a point to the rear of the last of said series of blades and forwardly of the hole designed for attachment of the hook, said tail member being longer than the longest of the blades of said series and increasing in width from its point of attachment to the spoon portion toward its outer edge, the tail member also being bent toward the convex side of the spoon portion, the outer, rear edge of the tail member being substantially straight, said tail member causing the spoon to flutter irregularly with respect to the axis of the line by which the bait is drawn through the water.

OTIS R. ANGELL.

REFERENCES CITED

The following references are of record in the file of this patent:

UNITED STATES PATENTS

| Number | Name | Date |
|---|---|---|
| 872,817 | Hipp | Dec. 3, 1907 |
| 1,991,142 | Eggleston | Feb. 12, 1935 |

FOREIGN PATENTS

| Number | Country | Date |
|---|---|---|
| 108,245 | Sweden | June 17, 1943 |